(No Model.) 2 Sheets—Sheet 2.
C. E. CLINE & C. H. KILPATRICK.
GATE.
No. 487,718. Patented Dec. 13, 1892.
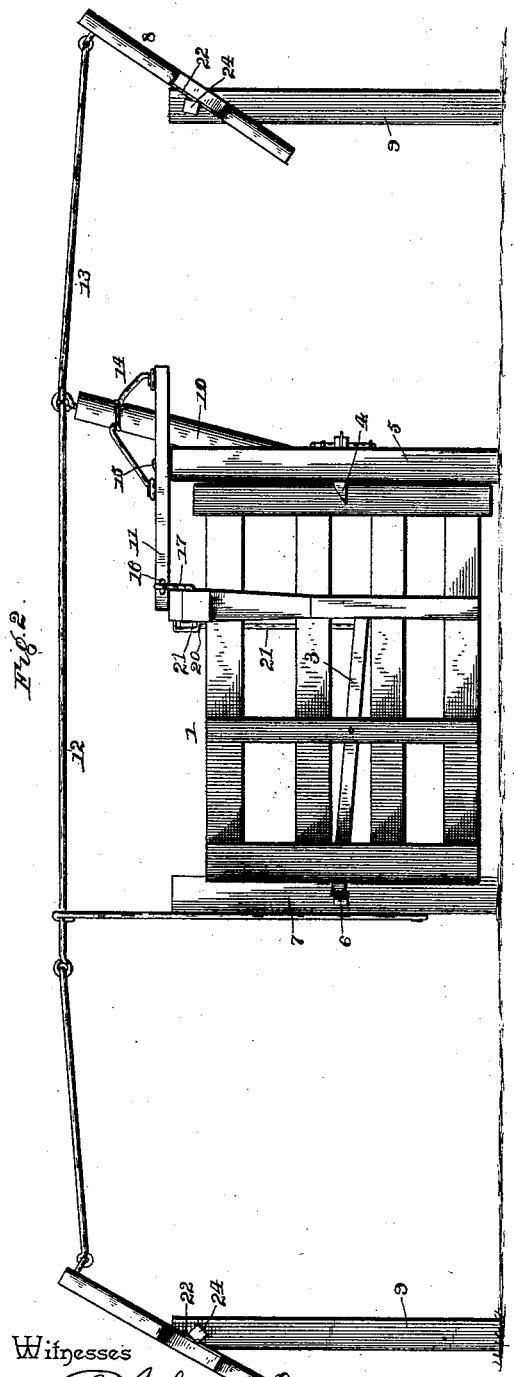
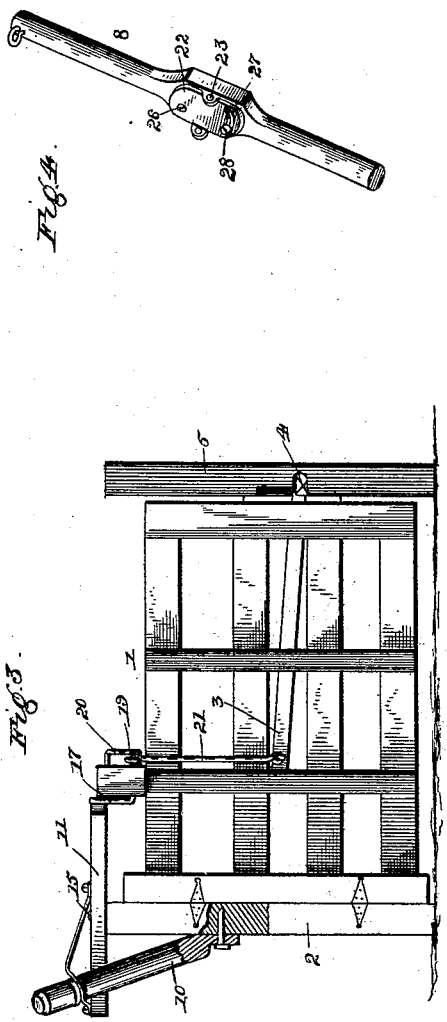
Witnesses
F. M. Johnson
H. J. Riley
Inventors
Chas. E. Cline
Chas. H. Kilpatrick
By their Attorneys,
C. A. Snow & Co.

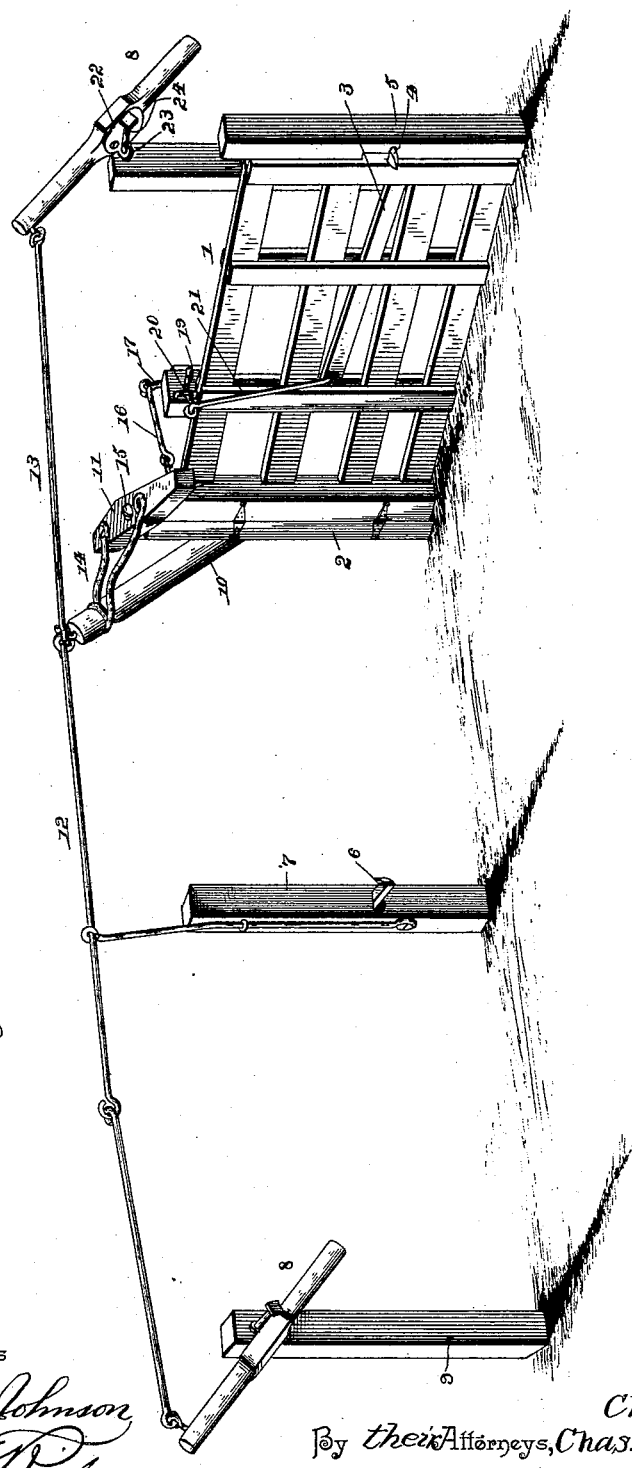

UNITED STATES PATENT OFFICE.

CHARLES E. CLINE AND CHARLES H. KILPATRICK, OF ABINGDON, ILLINOIS, ASSIGNORS OF ONE-THIRD TO GEORGE W. CLINE, OF SAME PLACE.

GATE.

SPECIFICATION forming part of Letters Patent No. 487,718, dated December 13, 1892.

Application filed August 2, 1892. Serial No. 441,968. (No model.)

*To all whom it may concern:*

Be it known that we, CHARLES E. CLINE and CHARLES H. KILPATRICK, citizens of the United States, residing at Abingdon, in the county of Knox and State of Illinois, have invented a new and useful Gate, of which the following is a specification.

The invention relates to improvements in gates.

The object of the present invention is to provide simple and effective means for operating swinging gates and to enable the same to be readily opened and closed at a suitable distance from them to avoid the necessity of dismounting or leaving a vehicle.

The invention consists in the construction and novel combination and arrangement of parts hereinafter fully described, illustrated in the accompanying drawings, and pointed out in the claims hereto appended.

In the drawings, Figure 1 is a perspective view of a gate constructed in accordance with this invention and shown closed. Fig. 2 is a side elevation, the gate being open. Fig. 3 is an elevation partly in section. Fig. 4 is a detail perspective view of one of the operating-levers.

Like numerals of reference indicate corresponding parts in all the figures of the drawings.

1 designates a swinging gate hinged to a post 2 and provided with a pivoted latch-bar 3, adapted to engage a keeper 4 of a latch-post 5 when the gate is closed and to engage a keeper 6 of a supplemental latch-post 7 when the gate is open.

The gate is operated by levers 8, fulcrumed on uprights 9 and arranged at suitable distances from the gate on opposite sides thereof and having their upper ends connected with an oscillating lever 10. The latter has its lower end beveled and fulcrumed on the hinge-post 2, and it is connected with a horizontal gate-lever 11, which is fulcrumed at a point intermediate of its ends on the top of the hinge-post and has one of its ends connected with the gate and the latch thereof, whereby when one of the operating-levers is moved the latch will be operated and the gate actuated. The oscillating lever 10 is connected with the operating-levers by wires 12 and 13 and also with the horizontal gate-lever by a V-shaped connecting-piece 14, provided at its apex with an eye receiving the oscillating lever, which latter is provided with an annular groove in which the eye is arranged, and the ends of the sides of the connecting-piece 14 are secured to the upper face of the horizontal lever on opposite sides of the pivot 15 and near one end of the horizontal lever. The latter extends beyond the V-shaped connecting-piece and is connected by a link 16 with an arm 17 of a bell-crank lever 18. The bell-crank lever 18 is fulcrumed on the gate and consists of the said arm 17, an arm 19, disposed at an angle to the arm 17, and a connecting portion which forms the fulcrum or pivot of the lever 18. The arm 19 is arranged in a keeper 20 and is connected by a rod 21 with the inner end of the latch-bar, whereby the latter will be operated in opening and closing the gate.

The operating-levers are secured to plates 22, which are provided with lugs 23, perforated to receive horizontal bolts or pins 24. Each lever is pivoted by a screw 26 at one end of the plate, and the opposite end of the plate is provided with a transversely-disposed slot 27, in which is arranged a screw 28, whereby the operating-lever is allowed a limited swing on the plate.

The latch-keepers on the latch-post and the supplemental latch-post are spring-actuated and are readily engaged by the latch-bar when the gate opens and closes, whereby the gate is held both when open and closed.

The inward and outward swinging of the lower handle ends of the operating-levers greatly facilitates their operation from a vehicle, as they can be drawn outward or moved inward to suit the position of the operator and avoid the necessity of leaning far out of a vehicle to open the gate.

What we claim is—

1. The combination of a hinge-post, a swinging gate hinged thereto and provided with a vertically-disposed keeper 20, arranged at the top of the gate, a bell-crank lever composed of arms 17 and 19, disposed at an angle to each other, and a connecting-journal portion fulcrumed on the gate, the arm 19 being arranged within the keeper 20, a horizontal latch-bar pivotally mounted on the gate, a rod 21, connecting the inner end of the latch-bar with the arm 19, a horizontal lever fulcrumed intermediate of its ends on the hinge-post, a rod 16, connecting one end of the horizontal lever with the arm 17, an oscillating lever fulcrumed at its lower end on the hinge-post and inclining upward and outward therefrom, a V-shaped connecting-piece attached at its apex to the oscillating lever and having its arms secured to the horizontal lever on opposite sides of the pivotal point of the latter, and operating-levers connected with the oscillating lever, substantially as described.

2. The combination of a hinge-post, a swinging gate hinged thereto, a horizontal gate-lever pivoted to the top of the hinge-post and having one end connected with the gate, an oscillating lever fulcrumed on the hinge-post, a V-shaped connecting-piece having its sides secured to the gate-lever on opposite sides of the pivotal point and provided at its apex with an eye receiving the oscillating lever, and operating-levers connected with the oscillating lever, substantially as described.

3. The combination of a swinging gate, a horizontal gate-lever connected therewith, an oscillating lever connected with the gate-lever, an upright provided with a horizontal bolt, a plate provided with perforated lugs receiving the bolt, said plate having at one end a transverse slot, and an operating-lever pivoted to one end of the plate and engaging the slot at the other end thereof and having its upper end connected with the oscillating lever, substantially as described.

In testimony that we claim the foregoing as our own we have hereto affixed our signatures in the presence of two witnesses.

CHARLES E. CLINE.
CHARLES H. KILPATRICK.

Witnesses:
GEO. W. CLINE,
J. W. JARVIS.